United States Patent
Todorovic et al.

(10) Patent No.: US 10,028,133 B2
(45) Date of Patent: Jul. 17, 2018

(54) TIMING DELIVERY OF OVER-THE-AIR DATA TO A VEHICLE

(71) Applicant: GENERAL MOTORS LLC, Detroit, MI (US)

(72) Inventors: Monika Todorovic, Shelby Township, MI (US); Christopher Lucarelli, Rochester Hills, MI (US); Kyle M. Ellard, Farmington Hills, MI (US); Jeffrey J. Olsen, Royal Oak, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/332,764

(22) Filed: Oct. 24, 2016

(65) Prior Publication Data

US 2018/0115889 A1    Apr. 26, 2018

(51) Int. Cl.
| | |
|---|---|
| H04W 4/00 | (2018.01) |
| H04W 8/24 | (2009.01) |
| H04W 4/021 | (2018.01) |
| H04W 4/20 | (2018.01) |
| H04W 28/02 | (2009.01) |
| H04W 4/21 | (2018.01) |

(52) U.S. Cl.
CPC .......... *H04W 8/245* (2013.01); *H04W 4/022* (2013.01); *H04W 4/206* (2013.01); *H04W 4/21* (2018.02); *H04W 28/0268* (2013.01)

(58) Field of Classification Search
None
See application file for complete search history.

(56) References Cited

U.S. PATENT DOCUMENTS

| | | | | |
|---|---|---|---|---|
| 8,040,864 | B2* | 10/2011 | Karaoguz | H04N 21/23805 370/252 |
| 8,219,090 | B2* | 7/2012 | Hosain | H04W 48/18 455/432.1 |
| 8,331,959 | B2* | 12/2012 | Tomioka | H04W 28/16 455/432.3 |
| 2007/0049260 | A1* | 3/2007 | Yuhara | H04L 67/18 455/414.3 |
| 2011/0250877 | A1* | 10/2011 | Krause | H04M 3/5183 455/419 |

(Continued)

*Primary Examiner* — Shantell L Heiber
(74) *Attorney, Agent, or Firm* — David Willoughby; Reising Ethington P.C.

(57) ABSTRACT

A mobile vehicle communications system and a method of using that system to provide over-the-air (OTA) data from a vehicle backend system to a target vehicle. The method includes the steps of: receiving wireless carrier system (WCS)-associated data from a plurality of vehicles that are associated with the backend system; in response to the receiving step, determining a preferred geographic communication region from among a plurality of geographic communication regions, wherein the determination includes determining that the preferred geographic communication region meets or exceeds a quality of service (QoS) threshold that at least some of the remaining plurality of geographic communication regions do not meet or exceed; and in response to the determining step, transmitting the OTA data from the backend system to the target vehicle when the target vehicle is within the preferred geographic communication region.

17 Claims, 3 Drawing Sheets

(56) References Cited

U.S. PATENT DOCUMENTS

| | | | | |
|---|---|---|---|---|
| 2013/0060653 A1* | 3/2013 | Sharkey | ............... | H04L 69/321 |
| | | | | 705/26.3 |
| 2015/0281906 A1* | 10/2015 | Tseng | ................... | H04B 1/3822 |
| | | | | 455/456.3 |
| 2016/0174214 A1* | 6/2016 | Yerramalli | ........ | H04W 72/0413 |
| | | | | 370/329 |
| 2017/0011562 A1* | 1/2017 | Hodges | ................. | G07C 5/008 |

\* cited by examiner

TIMING DELIVERY OF OVER-THE-AIR DATA TO A VEHICLE

TECHNICAL FIELD

The present invention relates to providing over-the-air data to vehicles, and more particularly to timing delivery of the wireless data to minimize an impact to wireless carrier system operations, to minimize impact to vehicle communications, or both.

BACKGROUND

Remotely located computers (e.g., which are coupled to a cellular network) may support the operations of millions of mobile vehicles by periodically transmitting software updates to the vehicles—e.g., so that the updates may be installed at onboard vehicle computer modules and improve vehicle performance. Transmitting large quantities of these updates can cause cellular network congestion resulting in localized degradation of wireless services (e.g., depending on vehicle locations), lost updates (e.g., due to collisions), or the like. Further, receiving these updates at the vehicle may degrade a user's experience—e.g., particularly when the update(s) are received while the respective vehicle is using a large portion of its cellular bandwidth (e.g., when the vehicle is receiving streaming music or video via a cellular connection).

Thus, there is a need to provide relatively small data transmissions (such as software updates, messages and notifications, etc.) to a large number of vehicles without hampering the performance of the cellular network or degrading user experiences at each of the respective vehicles.

SUMMARY

According to an embodiment of the invention, there is provided a method of providing over-the-air (OTA) data from a vehicle backend system to a target vehicle. The method includes the steps of: receiving wireless carrier system (WCS)-associated data from a plurality of vehicles that are associated with the backend system; in response to the receiving step, determining a preferred geographic communication region from among a plurality of geographic communication regions, wherein the determination includes determining that the preferred geographic communication region meets or exceeds a quality of service (QoS) threshold that at least some of the remaining plurality of geographic communication regions do not meet or exceed; and in response to the determining step, transmitting the OTA data from the backend system to the target vehicle when the target vehicle is within the preferred geographic communication region.

According to another embodiment of the invention, there is provided a method of providing over-the-air (OTA) data from a vehicle backend system to a target vehicle. The method includes the steps of: receiving wireless carrier system (WCS)-associated data from a plurality of vehicles that are associated with the backend system; in response to the receiving step, determining at least one preferred geographic communication region using the WCS-associated data; receiving at the backend system location information associated with the target vehicle; when the location information indicates that the target vehicle is within the at least one preferred geographic communication region, then transmitting the OTA data to the target vehicle via a wireless carrier system; and when the location information indicates that the target vehicle is not within the at least one preferred geographic communication region, performing steps (a)-(c) at the backend system: (a) storing an identifier of the target vehicle in a data registry; (b) later determining that the target vehicle is within the at least one preferred geographic communication region; and then (c) transmitting the OTA data to the target vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

A vehicle backend system is described below that is configured to provide cellular or over-the-air (OTA) data between the backend system and a number of target vehicles. More particularly, the backend system may determine when to transmit the OTA data based on of wireless carrier system data, location information of the respective target vehicles, and a readiness to receive the OTA data at the respective target vehicles. The backend system also may determine when to delay transmitting OTA data and consequently, place the vehicle in a queue until conditions are less likely to unduly congest the wireless carrier system, negatively affect a vehicle user experience, or both.

Communications System

Figure 1:
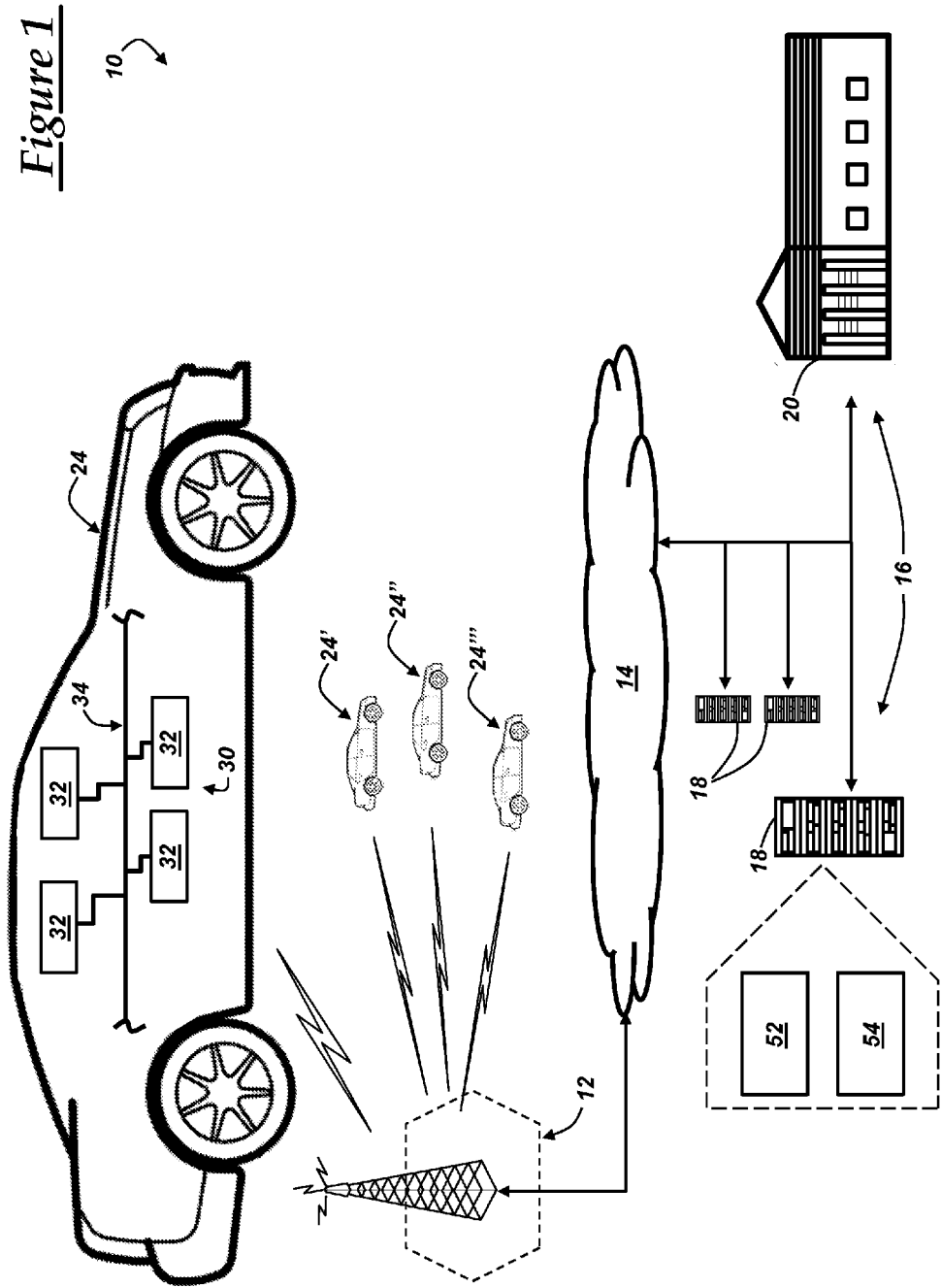
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a vehicle backend system 16 that may include at least one of a remote server 18, a data service center 20, or both; and one or more telematics-enabled vehicles 24, 24', 24", 24'". It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 may be any suitable cellular telephone system that includes one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 12 with the land network 14 or to connect the wireless carrier system with user equipment (UEs, e.g., which include telematics equipment in vehicles 24, 24', 24", 24'"). Cellular system 12 can implement any suitable communications technology, including for example GSM/GPRS technology, CDMA or CDMA2000 technology, LTE technology, etc. In general, wireless carrier systems 12, their components, the arrangement of their components, the interaction between the components, etc. is generally known in the art.

Land network 14 may be a conventional land-based telecommunications network that is connected to one or more landline telephones and connects the wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

According to one embodiment, the vehicle backend system 16 includes both the data service center 20 and a plurality of remote servers 18—and in some implementations, the service center 20 maintains one or more private connections between it and the remotely-located servers 18. As described below, the service center 20 and the servers 18 may be arranged to provide a number of vehicle services to vehicles 24, 24', 24", 24'". For example, in accordance with a subscriber relationship between users of the vehicles and the backend system 16, the backend system may provide navigation services, emergency vehicle services, vehicle software update services, various notification services, etc., as will be explained more below.

In some implementations, remote server(s) 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from vehicles 24, 24', 24", 24'", or a third party repository to or from which vehicle data or other information is provided, whether by communicating with the vehicles 24, 24', 24", 24'", with data service center 20, or both. Remote server(s) 18 can also be used for providing Internet connectivity such as DNS services or as a network address server that uses DHCP or other suitable protocol to assign an IP address to the vehicles 24, 24', 24", 24'".

In at least one embodiment, each server 18 includes one or more processors 52 coupled to memory (or one or more memory devices) 54. Processor(s) 52 can be any type of device capable of processing and/or executing instructions, wherein non-limiting examples include microprocessors, microcontrollers, host processors, controllers, server-to-server communication processors, and application specific integrated circuits (ASICs). Processor(s) 52 may be dedicated to a particular backend system function, or some processor(s) may be shared with other backend system or other remote server computers.

In at least one embodiment, the processor(s) 52 may perform or execute a number of instructions stored on memory 54 to provide over-the-air (OTA) data from the backend system 16 to a particular vehicle (e.g., a target vehicle such as vehicle 24), including one or more of the following: (1) receiving wireless carrier system associated data (WCS-associated data) from a plurality of vehicles 24, 24', 24", 24'", etc.; (2) identifying or otherwise determining one or more preferred geographic communication regions based on the WCS-associated data; (3) selecting, identifying, or otherwise determining a list or listing of target vehicles (e.g., such as target vehicle 24) having subscriber relationships with the backend system 16, wherein the target vehicles are designated to receive OTA data; (4) determining location information (e.g., position and/or heading data) associated with the respective target vehicles; (5) determining which of the target vehicles are within a preferred geographic communication region; (6) determining whether at least some of the target vehicles have available cellular bandwidth based on the current usage at the respective vehicle (e.g., whether the available bandwidth is greater than a predetermined threshold); (7) transmitting OTA data from the backend system to the target vehicles which are identified to be within a preferred geographic communication region, which have available bandwidth, or which both are within a preferred geographic communication region and have available bandwidth; (8) adding at least some target vehicles to a data registry in the backend system when the particular target vehicle is not within one of the preferred geographic communication regions or does not have available bandwidth; (9) re-determining location information associated with a target vehicle when the particular target vehicle is not within one of the preferred geographic communication regions (or did not previously have available bandwidth); and (10) repeatedly re-determining or updating the preferred geographic communication regions—e.g., including updating the preferred geographic communication regions when the particular target vehicle is not within one of the preferred geographic communication regions.

Of course, the processor(s) 52 may carry out other instructions stored on memory 54 as well. Thus, it should be appreciated that processor(s) 52 may carry out at least a portion of the method described herein, as will be discussed in greater detail below.

Memory 54 of server(s) 18 may be used to store any suitable vehicle backend data, such as vehicle data records, as well as the exemplary method instructions discussed above. Memory 54 includes any non-transitory computer usable or readable medium, which includes one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one implementation, the memory 54 includes non-volatile memory (e.g., ROM, EPROM, EEPROM, etc.). These of course are merely examples; other implementations are contemplated herein.

Data service center 20 is designed to provide the vehicles 24, 24', 24", 24'" with a number of different system back-end functions and generally includes one or more switches, servers, databases, live advisors, as well as an automated voice response system (VRS). These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store vehicle data records or any other suitable account information, including but not limited to subscriber authentication information, vehicle identifiers, profile records, behavioral patterns, and other pertinent subscriber information. Data transmissions from the service center 20 may also be conducted by wireless systems, such as LTE, CDMA, UMTS, GSM/GPRS, 802.11x, and the like. Although one embodiment has been described as it would be used in conjunction with a manned data service center 20 using a live advisor, it will be appreciated that the data service center can instead utilize VRS as an automated advisor or, a combination of VRS and a live advisor can be used. Further, a number of other automated vehicle services may be provided by the data service center 20, e.g., wherein the data service center 20 communicates with the vehicles 24, 24', 24", 24''', etc. without interaction by drivers or users of the respective vehicles.

FIG. 1 illustrates multiple vehicles 24, 24', 24", 24''', and in at least one embodiment, each vehicle (or associated vehicle user) may have a subscriber relationship with the backend system 16. Vehicles 24, 24', 24", 24''' may be the same or similar; therefore, only one vehicle (24) will be described herein. Vehicle 24 is depicted as a passenger car, but it should be appreciated that any other vehicle including motorcycles, trucks, sports utility vehicles (SUVs), recreational vehicles (RVs), marine vessels, aircraft, etc., can also be used. Vehicle 24 may include a vehicle communication system 30 that includes, among other things, one or more vehicle system modules (VSMs) 32 and one or more network connections 34.

Vehicle system modules (VSM) 32 may be embodied as electronic hardware components or modules located throughout the vehicle 24 and typically receive input from one or more sensors and use the sensed input to perform diagnostic, monitoring, control, reporting and/or other functions. Non-limiting examples of VSMs 32 include a body control module (BCM) for controlling power locks, headlights, etc., an engine control module (ECM) for controlling fuel ignition, ignition timing, etc., an onboard diagnostics module (OBDM) for reporting diagnostic trouble codes and the like, and a GPS (Global Positioning System) or GLONASS (Global Navigation Satellite Service) device for providing vehicle navigation services and reporting position data to the backend system 16. As will be appreciated by those skilled in the art, the above-mentioned VSMs are only examples of some of the modules that may be used in vehicle 24, and numerous other examples are also possible.

At least one VSM 32 may be a gateway module such as a vehicle telematics unit adapted for short range wireless communication and/or cellular communication. For example, a telematics unit may be an OEM-installed (embedded) or aftermarket device that is installed in the vehicle 24 and that enables wireless voice and/or data communication over wireless carrier system 12 and via wireless networking. This enables the vehicle to communicate with backend system 16, other telematics-enabled vehicles, or some other entity or device (e.g., via cellular communication according to an LTE, GSM, CDMA, or other suitable telecommunication standard). The telematics unit preferably uses radio transmissions to establish a communications channel (a voice channel and/or a data channel) with wireless carrier system 12 so that voice and/or data transmissions can be sent and received over the channel. By providing both voice and data communication, the telematics unit enables the vehicle 24 to provide a number of different services including those related to navigation, telephony, emergency assistance, diagnostics, infotainment, user notification services, etc. Data can be sent either via a data connection, such as via packet data transmission over a data channel, or via a voice channel using techniques known in the art. For combined services that involve both voice communication (e.g., with a live advisor or voice response unit at the data services center 20) and data communication (e.g., to provide GPS location data or vehicle diagnostic data to the data services center), the system can utilize a single call over a voice channel and switch as needed between voice and data transmission over the voice channel, and this can be done using techniques known to those skilled in the art.

As will be explained in greater detail below, the telematics unit 32 also may be adapted to receive data associated with configuration changes of communication system 30, as well as vehicle system updates (e.g., software or instructional updates) associated one or more of the vehicle system modules 32. For example, the telematics unit may receive from the backend system 16 so-called OTA data or 'over-the-air' cellular communications that include vehicle system updates and/or configuration change data for system 30. OTA data may be a short data burst and may have a relatively small total payload—e.g., wherein the total payload comprises the vehicle system update or configuration update itself. OTA data may be carried by one or more SMS messages or a relatively small quantity of data cellular data packets, just to cite a couple of examples. For example, according to one non-limiting embodiment, the total payload of the OTA data may be approximately 500 Megabytes (MB) or less. Thus, in at least one embodiment, OTA data does not comprise streaming media or any so-called "streaming data." Receipt of OTA data at the telematics unit 32 (and even installation of the updates) may occur, in some instances, automatically and without user interaction.

Network connection(s) 34 include any wired or wireless intra-vehicle communications system for interconnecting or coupling the VSMs 32—as well as other vehicle electronic devices, sensors, etc.—to one another. For example, network connection 34 may be a data bus (e.g., a communication bus, entertainment bus, etc.). Non-limiting examples of suitable wired network connections 34 include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few. Non-limiting examples of suitable wireless network connections 34 include any short range wireless communication link—e.g., such as a Wi-Fi link, a Wi-Fi Direct link, a Bluetooth or BLE link, a Near-Field Communication link, etc.

Below, one or more methods of using the communications system 10 will be described. More particularly, at least one method will be described of providing over-the-air (OTA) data from a vehicle backend system to multiple target vehicles (e.g., such as vehicle 24) by timing the delivery of OTA data so as to minimize congestion of network traffic over the wireless carrier system. Further, in at least one embodiment, the method may send or not send the OTA data based on cellular usage and/or available bandwidth at a particular target vehicle—e.g., thereby avoiding or minimizing degradation of the user experience when the vehicle user is already connected via a voice and/or data call or connection.

The method is described with respect to one target vehicle (24); however, it should be appreciated that the same method may be applied to multiple target vehicles simultaneously, concurrently, and/or sequentially—thereby improving backend system operating efficiency.

Method

Figure 2:
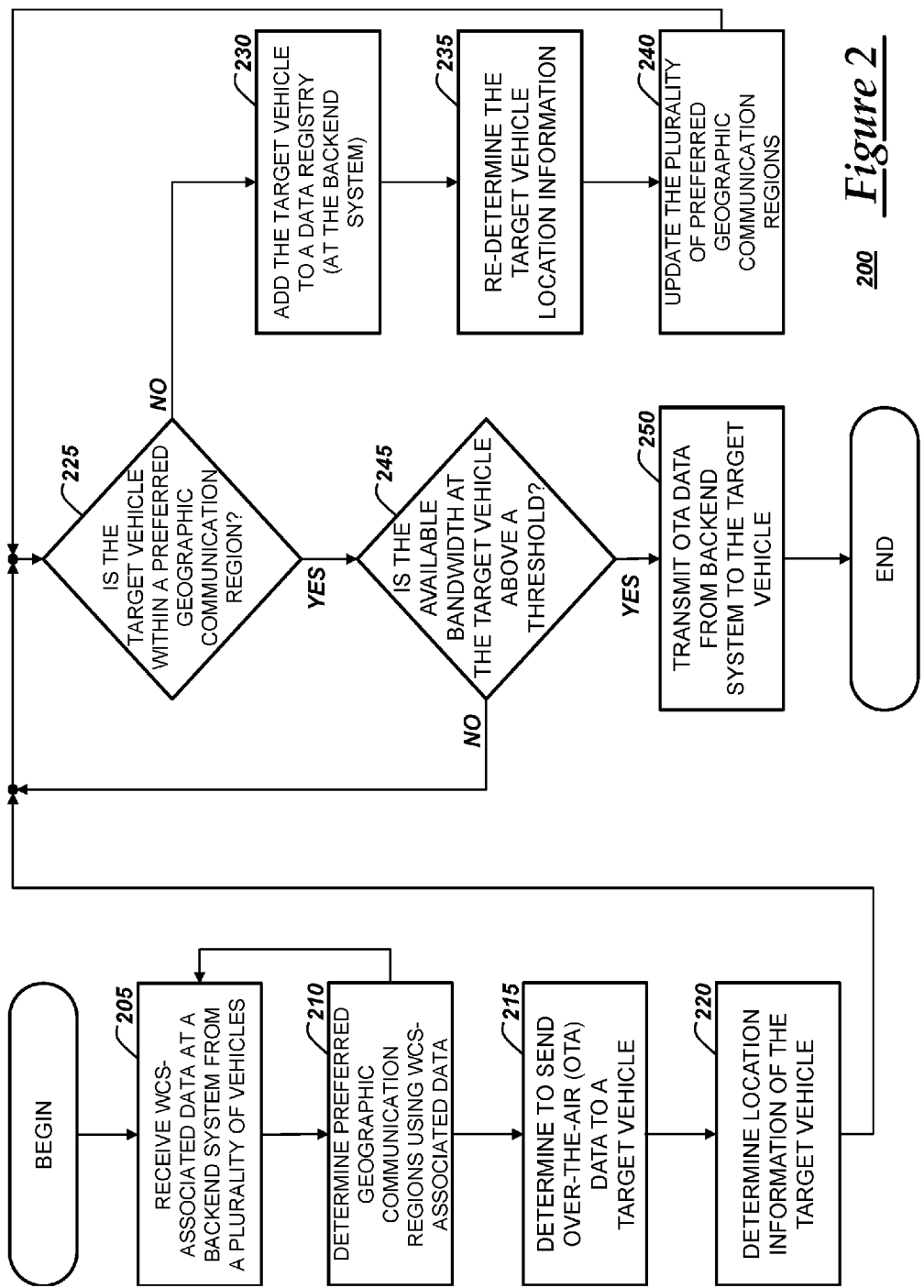
FIG. 2 is a flow diagram of a method of providing over-the-air (OTA) data from a vehicle backend system to a target vehicle.

As shown in the flow diagram of FIG. 2, a method 200 is illustrated that pertains to transmitting or otherwise providing over-the-air (OTA) data from the backend system 16 to target vehicle 24. More particularly, in at least one embodiment, the method 200 pertains to timing the transmission of the OTA data to the target vehicle 24 based at least in part on collected, aggregated, and/or analyzed so-called 'big data' received from multiple subscriber vehicles (e.g., vehicles 24', 24", 24''' and even vehicle 24). Thus, method 200 may minimize congestion of cellular network traffic within the wireless carrier system 12 and/or may minimize (or avoid) negatively affecting the user experience within the target vehicle 24. Vehicles 24, 24', 24", 24''' are representative of hundreds, thousands, millions, etc. of vehicles which are previously-associated with one or more of the remote servers 18, with the data service center 20, or with a combination thereof. And as used herein, the phrase 'big data' pertains to relatively large sets of wireless carrier system associated data (WCS-associated data) (e.g., sets that are terabytes (TBs) and larger) which may be received and analyzed by the backend system 16 to determine patterns, trends, associations, and the like among vehicles 24, 24', 24", 24'''. WCS-associated data will be described in greater detail below.

In the description that follows, the OTA data transmitted by the backend system 16 is embodied as a vehicle system update (e.g., an instructional or software update for at least one onboard VSM 32); however, other examples also exist. For example, the OTA data could comprise a vehicle command from the backend system 16 or a notification or message. Exemplary notifications include a message for a user or driver of the vehicle 24; e.g., such as a visible or audible message, etc. As discussed above, the total payload of OTA data may be relatively small. In this manner, the transmission of OTA data may be time or scheduled so that a moving target vehicle may receive the OTA data during preferred conditions, as explained more below (e.g., before the moving vehicle exits the desirable conditions).

Method 200 may begin with step 205 wherein the backend system 16 may receive and collect WCS-associated data from vehicles 24, 24', 24", 24'''. For example, vehicles 24, 24', 24", 24''' periodically or occasionally may provide so-called vehicle data uploads to the backend system 16—e.g., vehicles 24, 24', 24", 24''' may transmit data associated with the wireless carrier system 12, their respective cellular connections thereto, etc. For example, the WCS-associated data provided by each vehicle 24, 24', 24", 24''' may include data particular to the respective vehicle's cellular connection such as: the cellular technology of its connection (LTE, CDMA, GSM/GPRS, UMTS, etc.), the throughput speed of its connection, the signal strength of its connection, and the signal quality of its connection, just to cite a few examples.

For example, as a vehicle travels to a destination it may connect to various cell towers in the wireless carrier system 12, and the vehicle may report to the backend system 16 that it journeys, for example, through an LTE cell (or other geographic region), then a CDMA cell (or other geographic region), and then another LTE cell (or other geographic region). The vehicle may report to the backend system 16 position data (e.g., latitude and longitude data—e.g., so-called lat-long data) associated with each of the connections. Thus, the vehicle(s) 24, 24', 24", 24''' may collect and report any suitable number of data points (e.g., technology type correlated to position data when connected via that technology type, timestamp data, etc.). Further, position data is not limited to lat-long data; skilled artisans will appreciate other types of position data, including predictive position data which may be reported to the backend system 16 during an absence of a suitable GPS satellite signal.

Continuing with the example, an exemplary vehicle also may gather information regarding a varying throughput speed of its connections during its journey. And for example, within a given geographic region, the throughput speed may change—thus, numerous throughput speeds may be correlated to numerous corresponding vehicle locations. Furthermore, for example, the vehicle may gather information regarding the signal strength and the signal quality of its various connections during its journey; it will be appreciated that within any given geographic region, the signal strength and the signal quality could vary also. Thus, numerous signal strengths and/or signal quality values may be correlated to a number of vehicle geographical locations.

Thus, during any single journey, any suitable quantity of data points may be measured and reported by the vehicle to the backend system 16. In at least one embodiment, each reported data point includes: technology type data, throughput speed data, signal strength data, signal quality data, timestamp data, and position data. Of course the vehicle does not need to report each data point in real-time or as it collects it. For example, the vehicle may store these data points and transmit a bundle of data points to the backend system 16 in a vehicle upload data at any suitable time. Thus, in at least one embodiment, the WCS-associated data received by the backend system 16 from each vehicle 24, 24', 24", 24''' in step 205 comprises a plurality of such data points.

It should be appreciated that as a result of vehicles 24, 24', 24", 24''' (e.g., potentially millions of vehicles) providing these data points to the backend system 16, a map or geographical model or algorithm may be utilized by the backend system 16 (e.g., using software in specially configured servers 18) (step 210). This model may be used to determine or identify geographical regions that currently have desirable cellular or WCS parameters—e.g., higher throughput values, less cellular traffic, lower cellular collisions rates, generally less network congestion, etc. Thus, for example, the model may determine a quality of service (QoS) score for geographic regions and may be determined using one or more of the following (from vehicles 24, 24', 24", 24''', etc.): technology type data, throughput speed data, signal strength data, signal quality data, timestamp data, and position data. In this determination, different data types may be weighed more heavily than another. As will be explained below, when a QoS score generated by the model exceeds a predetermined QoS threshold (which may also be set by the backend system 16), then that particular geographic region may be identified as desirable for an OTA data transmission.

The model described above may be developed to account for different times of the day, different days of the week, month, or year, holidays, etc. Further, the modeling data may be correlated to local weather patterns, local events, and the like. Thus, the geographical model may be a so-called 'living' model; i.e., it may be updated constantly and thus constantly evolving and being improved. Thus, it should be appreciated that while step 205 is shown as an initial step, step 205 may be ongoing throughout method 200.

Once at least some WCS-associated data is collected in step 205, then in step 210, the backend system 16 may determine current WCS parameters, a QoS score, etc., and based on the current WCS parameters, the QoS score, etc., the backend system may determine or identify at least one preferred geographic communication region in which to transmit OTA data to the target vehicle 24. As discussed above, preferred regions 60 may be those regions which have a QoS score which meets or exceeds a predetermined quality of service (QoS) threshold. In at least one embodiment, the backend system 16 executes computer modeling software stored on at least one computer server 18 to determine automatically a plurality of preferred geographic communication regions. It should be appreciated that steps 205 and 210 may occur at least partially concurrently and may be recursive—i.e., the more WCS-associated data collected and analyzed by the backend system 16, the more accurate (and more current) the identification of preferred geographic communication regions may become.

Figure 3:
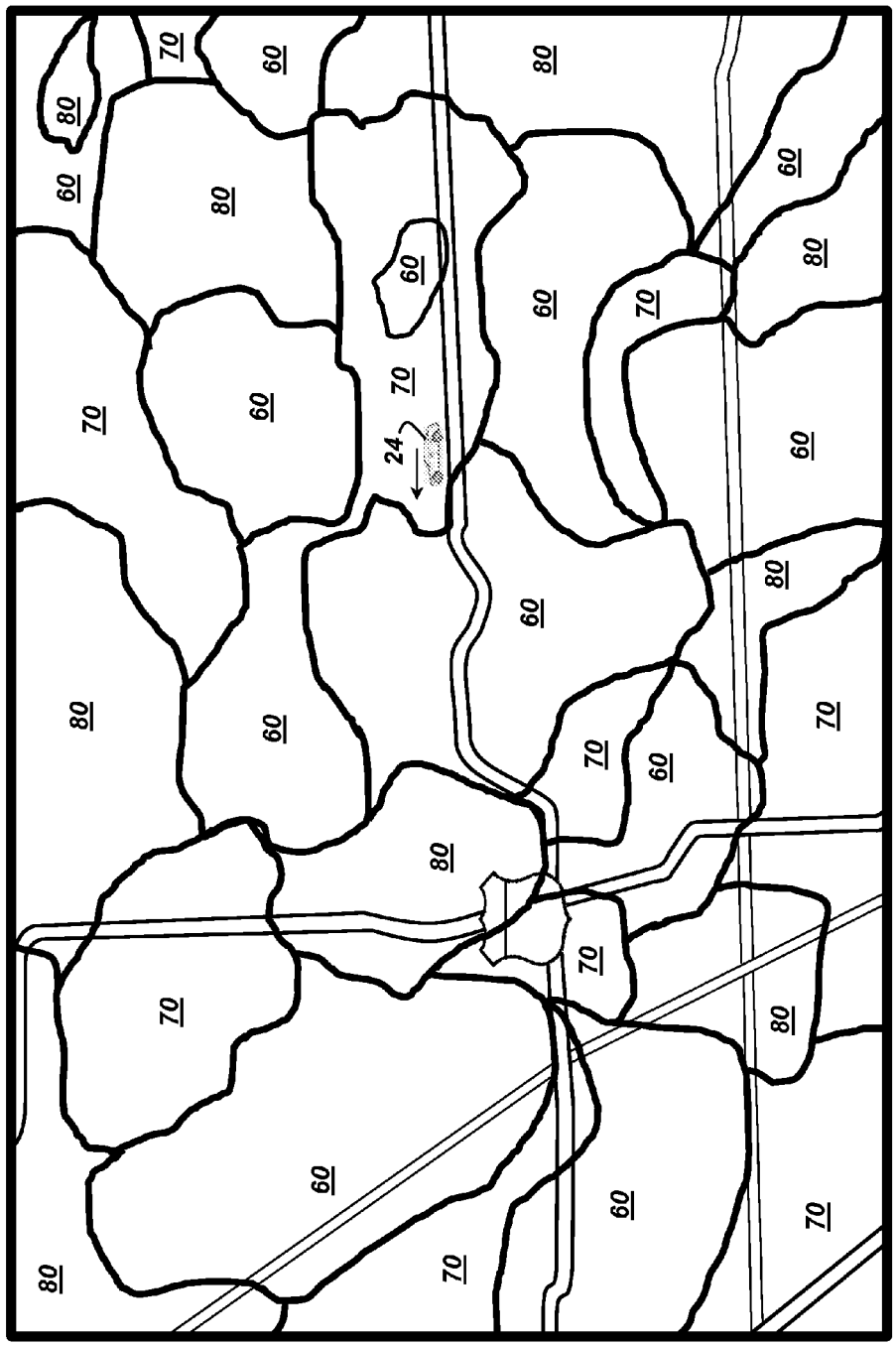
FIG. 3 illustrates an exemplary map indicating one or more preferred geographic communication regions.

FIG. 3 illustrates a map 300 of an illustrative geographic area having a plurality of primary or preferred geographic communication regions 60 (or simply preferred regions). In some instances, the preferred regions 60 may be one or more cells of the wireless carrier system 12; however, this is not required. For example, each region 60 may be defined by the WCS parameters of the respective region and may have any suitable different shape or border.

As discussed more below, other geographic communication regions also may be determined by the backend system 16. For example, one or more secondary or secondarily-preferred geographic communication regions 70 and one or more tertiary or tertiarily-preferred geographic communication regions 80 could be determined (FIG. 3). According to one embodiment, the preferred regions 60 may be highly suited for OTA data transmission, secondary regions 70 may be moderately or fairly suited for OTA data transmission, and tertiary regions 80 may be inadequately or still less suited for OTA data transmission. Of course, other categorical regions could also be determined by the backend system 16 as well. The relative size of the regions 60, 70, 80 may vary; thus, the illustrated regions are merely examples. On map 300, target vehicle 24 is shown moving through a secondary region 70—e.g., having a westbound heading toward one of the preferred regions 60.

Returning to FIG. 2, in step 215, the backend system 16 selects or otherwise determines to transmit over-the-air (OTA) data to the particular target vehicle 24. As discussed above, the backend system 16 may store a vehicle data record associated with target vehicle 24 at the server 18, and the system 16 may parse the vehicle data record and automatically may select the target vehicle 24 based on an identification that vehicle 24 has not received (and/or installed) a particular vehicle system update for one of the onboard VSMs 32. It should be appreciated that in step 215 the backend system 16 could generate a list or listing of vehicles that includes vehicle 24—e.g., each of which are desired to receive the particular OTA data.

In step 220, the backend system 16 determines the location of the target vehicle 24. This may be determined in a variety of ways. For purposes of illustration in method 200, the vehicle 24 provides lat-long data to the backend system 16. For example, this may occur periodically while the vehicle is moving (e.g., via a cellular link or an SMS communication).

In step 225, the backend system 16 determines whether the target vehicle 24 is within one of the preferred regions 60. For example, the backend system 16 may compare lat-long data received from vehicle 24 with one or more of the preferred regions 60 determined in step 210, and if the recently-received lat-long data indicates a position within a preferred region 60, then the method proceeds to step 245 where the available bandwidth of the target vehicle 24 may be determined or checked (as described more below). However, if the backend system 16 determines that the target vehicle 24 is not within one of the preferred regions 60—as is shown in FIG. 3—then, the method proceeds to step 230 (e.g., placing the vehicle 24 in a queue or data registry).

In other embodiments of step 225, the backend system 16 may predict that the target vehicle 24 is within a preferred region 60 even when recent position data of vehicle 24 is not known or available to backend system 16. For example, the backend system 16 may base the prediction on last known lat-long data and/or heading data. Heading data may be determined or derived from sequentially received lat-long data or other suitable position-related data (e.g., navigation data indicating turn-by-turn directions, etc.); determining heading data is generally known and will not be described in greater detail here.

In step 230, the target vehicle 24 (or more particularly, an identifier of the target vehicle 24) is stored within the data registry at the backend system 16. Non-limiting examples of identifiers include a vehicle identification number (VIN) or a telematics unit identifier (e.g., such as a serial number, a mobile identification number or MIN, or an access point name); other identifiers are possible.

In step 235 which follows, the backend system 16 may determine—e.g., calculate or estimate—location information associated with the target vehicle 24. For example, the target vehicle 24 may no longer be within secondary region 70 (as shown in FIG. 3); instead for example, vehicle 24 now may be located in a preferred region 60 (or another secondary region 70 or even a tertiary region 80). Such target vehicle location information can be determined in a manner similar to that described in step 220.

In step 240, the backend system 16 optionally may re-determine the boundaries of geographic regions 60, 70, 80. For example, it should be appreciated that time of day may affect cellular network conditions—thus, e.g., the boundaries of the multiple regions 60, 70, 80 may change throughout the day based on user equipment usage, RF interference, etc.

Following step 240, the method 200 may loop back and repeat step 225. Step 225 may be executed as described above—e.g., proceeding to step 245, or if the target vehicle 24 is still not within one of the preferred regions 60, then the method can repeat steps 230, 235, 240, and/or 225.

When the vehicle 24 is within one of the preferred regions 60, the method 200 proceeds to step 245. In step 245, the backend system 16 may determine whether an available bandwidth at the particular target vehicle 24 exceeds a predetermined threshold. For example, the vehicle 24 may transmit an available bandwidth parameter periodically to the backend system 16. Or using an existing cellular connection with the target vehicle 24, the backend system 16 may determine or calculate the bandwidth parameter. Other ways to determine available vehicle bandwidth are also contemplated. Further, the bandwidth parameter need not be an absolute value; e.g., it may be a percentage and/or take into account other factors (e.g., cellular technology, equipment characteristics, etc.). Regardless, once the available bandwidth parameter is received at the backend system 16, the backend system may compare the parameter with the predetermined threshold. If the available bandwidth parameter at target vehicle 24 exceeds the threshold, the method 200 may proceed to step 250. If it does not, method 200 may loop back and repeat step 225 (and the subsequent steps thereof). In at least one embodiment, no bandwidth will be considered to be available if the vehicle 24 must split its bandwidth between an existing connection and the OTA data—e.g., if the OTA data would be received while the vehicle is already engaged in another cellular connection.

In at least one embodiment, step 245 is optional. For example, when the target vehicle 24 in step 225 is determined to be within a preferred region 60, the method 200 may proceed directly to step 250.

In step 250, the backend system 16 transmits over-the-air (OTA) data to the target vehicle 24. Continuing with the example discussed above, the backend system 16 transmits a vehicle system update to the target vehicle 24. Thereafter, the method 200 ends. It should be appreciated that any vehicle system update received by the target vehicle 24 may be installed at any appropriate time (e.g., when the user and/or vehicle 24 determine installation may be safely performed). In at least one embodiment, the vehicle system update is stored at the vehicle 24 until a later time. Installation of vehicle system updates are generally known and will not be discussed in greater detail below.

Other embodiments also exist. For example, in at least one embodiment, the nature of the OTA data (e.g., the contents thereof) may influence the timing of the transmission of the OTA data. For example, if the payload size of the OTA is sufficiently small, the backend system 16 may transmit the OTA data when the vehicle is within a secondary region 70. Or for example, if the subject matter of the OTA data is urgent (e.g., is assigned a high priority), the OTA data may be transmitted even when the available bandwidth parameter indicates less than the predetermine threshold. Further, some OTA data may be transmitted in preferred regions 60 and secondary regions 70, but not tertiary regions 80. And this too may be based on the contents, priority, etc.

In another embodiment, the backend system 16 may desire to transmit a common OTA data (e.g., the same vehicle system update or the same notification) to a predetermined list of target vehicles which are generally proximate to one another. For example, a number of target vehicles may be in the same preferred region 60 at the same time (or may be predicted to be in the same preferred region 60 at the same time), and the backend system 16 may transmit the common OTA data to those particular target vehicles. Similarly, the backend system 16 could transmit different OTA data to a listing of target vehicles determined to be in the same geographic region during a limited timeframe. In yet another embodiment, the backend system 16 may not transmit OTA data to multiple proximately located target vehicles if doing so would exceed a threshold quantity of concurrent sessions at a given cell tower. In all cases, backend system computing efficiency may be increased enabling it to service a greater quantity of target vehicles.

In another embodiment, a single QoS criteria may be used to delay transmitting OTA data. For example, regardless of the QoS score, no OTA data may be transmitted if the signal strength is less than a predetermined low threshold.

In another embodiment, the determination of which regions are preferred may be made at the target vehicle 24. For example, the vehicle 24 could receive WCS-associated data associated with its current geographic region from the backend system 16 (or even the wireless carrier system or a wireless service provider), determine when it had available bandwidth, and when the vehicle 24 has available bandwidth and it determines that it is within a preferred region 60, it could request a backend system transmission of OTA data. Other suitable implementations are also possible.

Thus, there has been described a method of providing over-the-air data from a vehicle backend system to one or more target vehicles. The method includes determining at the backend system wireless carrier system parameters—which are based on data collected from subscriber vehicles associated with the backend system. Further, the method includes determining preferred geographic regions based on those parameters. Then, when the target vehicle(s) are in the preferred region(s), the backend system may send desired the over-the-air data to those target vehicles. The preferred geographic regions can be those which have a more evolved cellular technology type, those which are providing a higher data throughput, those which are providing a higher signal quality, and/or those which are providing a higher signal strength. In at least one implementation, the preferred regions are determined at the backend system based on each of these criteria. The method further can include determining whether the target vehicle(s) are ready to receive the over-the-air data by first determining whether receiving the over-the-air data will affect a current wireless communication or connection at the target vehicle. If the wireless communication at the target vehicle would be negatively impacted by sending the over-the-air data, the backend system may delay delivery of the data. Ultimately, the method minimizes cellular network congestion and also improves the user experience within the targeted vehicles.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing over-the-air (OTA) data from a vehicle backend system to a target vehicle, comprising the steps of:
   receiving wireless carrier system (WCS)-associated data from telematics units installed in a plurality of vehicles that are associated with the vehicle backend system;
   in response to the receiving step, determining at the vehicle backend system a preferred geographic communication region from among a plurality of geographic communication regions, wherein the determination is based on the WCS-associated data and includes determining a quality of service (QoS) score for each of the plurality of geographic communication regions, and wherein the preferred geographic communication region meets or exceeds a QoS score threshold that at least some of the remaining plurality of geographic communication regions do not meet or exceed; and determining, at the vehicle backend system, a current location or a predicted location of the target vehicle and transmitting the OTA data from the vehicle backend system to the target vehicle when the target vehicle is within, or predicted to be within, the preferred geographic communication region.

2. The method of claim 1, further comprising determining at least one secondary geographic communication region using the WCS-associated data and at least one tertiary geographic communication region using the WCS-associated data, wherein the at least one preferred geographic communication region, when compared with the at least one secondary or tertiary geographic communication regions, includes at least one of: a more evolved cellular technology type than other currently available cellular technology types, a higher throughput rate, a higher signal quality, or a higher signal strength.

3. The method of claim 2, wherein throughput rate data for any geographic communication region is based on data collected at the backend system over a plurality of days, data collected at the backend system at an approximate time of the day, or both.

4. The method of claim 1, wherein the OTA data comprises a vehicle system update or a notification for a user of the target vehicle.

5. The method of claim 1, wherein a payload size of the transmitted OTA data is less than 50 Megabtyes (MB).

6. The method of claim 1, further comprising: prior to transmitting the OTA from the backend system to the target vehicle, performing steps (a)-(c):
 (a) receiving at the backend system location information associated with the target vehicle;
 (b) using the location information, determining that the target vehicle is not within the preferred geographic communication region; and
 (c) based on the determination that the target vehicle is not within the preferred geographic communication region, performing steps (c1) and (c2) at the backend system:
  (c1) storing an identifier of the target vehicle in a data registry; and
  (c2) later determining that the target vehicle is within the preferred geographic communication region; and
 (d) following steps (a)-(c), performing said step of transmitting the OTA data from the backend system to the target vehicle based on step (c2).

7. The method of claim 6, wherein the location information includes geographic position data and heading data associated with the target vehicle.

8. The method of claim 7, further comprising: using the position and heading data of the target vehicle, predicting at the backend system when the target vehicle will be in the preferred geographic communication region.

9. The method of claim 1, further comprising: receiving an available bandwidth parameter from the target vehicle, wherein the transmitting step occurs when the target vehicle is within the preferred geographic communication region and the available bandwidth parameter exceeds a predetermined threshold.

10. A method of providing over-the-air (OTA) data from a vehicle backend system to a target vehicle, comprising the steps of:
 receiving wireless carrier system (WCS)-associated data from telematics units installed in a plurality of vehicles that are associated with the vehicle backend system;
 in response to the receiving step, determining at the vehicle backend system at least one preferred geographic communication region using the WCS-associated data, wherein the determination includes determining a quality of service (QoS) score for each of the plurality of geographic communication regions, and wherein the at least one preferred geographic communication region meets or exceeds a QoS score threshold;
 receiving at the vehicle backend system location information associated with the target vehicle;
 when the location information indicates that the target vehicle is within the at least one preferred geographic communication region, then transmitting the OTA data to the target vehicle via a wireless carrier system; and
 when the location information indicates that the target vehicle is not within the at least one preferred geographic communication region, performing steps (a)-(c) at the vehicle backend system:
  (a) storing an identifier of the target vehicle in a data registry;
  (b) later determining that the target vehicle is within the at least one preferred geographic communication region; and then
  (c) transmitting the OTA data to the target vehicle.

11. The method of claim 10, wherein the location information includes geographic position data and heading data associated with the target vehicle.

12. The method of claim 10, further comprising determining at least one secondary geographic communication region using the WCS-associated data and at least one tertiary geographic communication region using the WCS-associated data, wherein the at least one preferred geographic communication region, when compared with the at least one secondary or tertiary geographic communication regions, includes at least one of: a more evolved cellular technology type, a higher throughput rate, a higher signal quality, or a higher signal strength.

13. The method of claim 12, wherein the more evolved cellular technology type is LTE technology.

14. The method of claim 10, wherein the plurality of vehicles includes the target vehicle.

15. The method of claim 10, wherein the OTA data includes a vehicle system update or a notification for a user of the target vehicle.

16. The method of claim 10, wherein a payload size of the transmitted OTA data is less than 50 Megabtyes (MB).

17. The method of claim 10, further comprising: receiving an available bandwidth parameter from the target vehicle, wherein the OTA data is transmitted to the target vehicle only when the available bandwidth parameter exceeds a predetermined threshold.

* * * * *